Oct. 17, 1950     P. J. RIES     2,526,046
AUTOMATICALLY ADJUSTABLE STOP DEVICE FOR TRIPOD LEGS
Filed Feb. 24, 1948
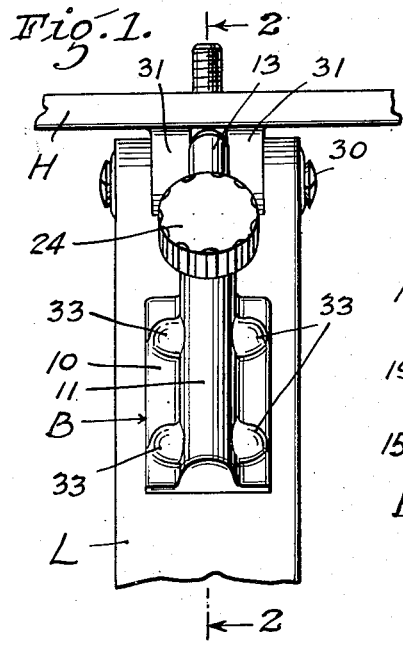
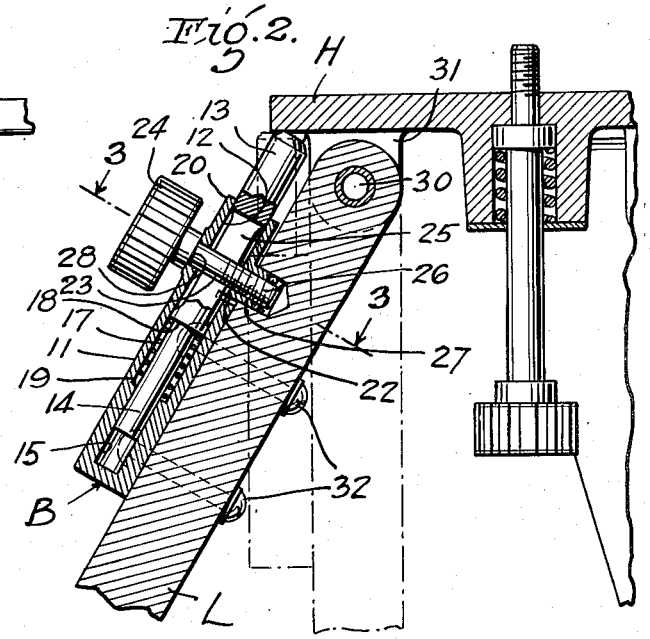
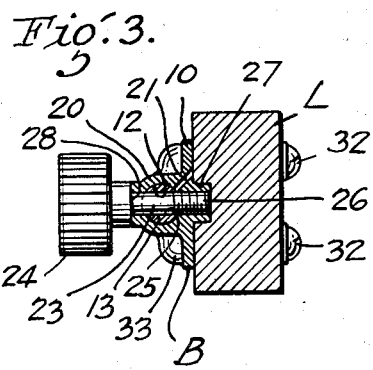
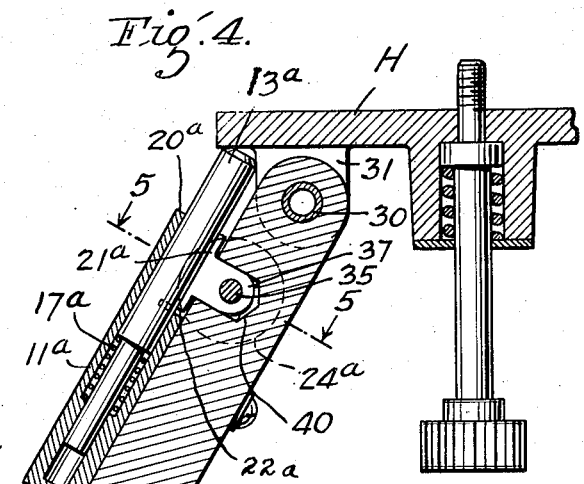
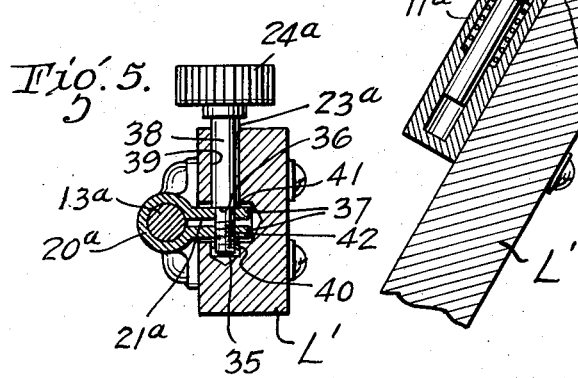
INVENTOR.
PARK J. RIES
BY
Frederick Diell
ATTORNEY Patented Oct. 17, 1950

2,526,046

UNITED STATES PATENT OFFICE 2,526,046

AUTOMATICALLY ADJUSTABLE STOP DEVICE FOR TRIPOD LEGS

Park J. Ries, Burbank, Calif.

Application February 24, 1948, Serial No. 10,306

7 Claims. (Cl. 248—188)

This invention relates to portable supports such as tripods, and more particularly to stop devices therefor, of the general character disclosed in United States Letters Patent No. 2,234,357, issued March 11, 1941, to Paul L. Ries and Park J. Ries.

The device of the patent above identified provides means manually adjustable to maintain the tripod legs in any selected position against spreading therebeyond, so as to prevent collapse of the tripod should its legs be struck or be resting on a surface providing insufficient friction to prevent displacement; to sustain the tripod legs against collapse in widely spread positions wherein the legs would otherwise not be self-supporting; to maintain the tripod legs against spreading beyond a selected position of adjustment, irrespective of various tilted positions of the tripod head wherein the legs would otherwise be incapable of self-support; and to maintain the tripod legs fully closed so as to enable any leg to be grasped as a handle by which to carry the tripod.

An object of my present invention is to provide a stop device for tripod legs having all the above recited advantages of the patented device, and, in addition, which is structurally characterized to be automatically adjustable to obviate the necessity of manually adjusting the device when changing the positions of the legs, it being merely necessary to lock the device when the legs have been moved to a desired adjusted position, and to unlock the device when it is to function in another position of the legs, for relocking of the device when the new leg position is reached, all to materially simplify and expedite the use of the tripod and of the stop device.

Another object of my present invention is to provide a stop device of the above described character embodying a stop or abutment member for each tripod leg, mounted thereon for adjustment automatically by being urged into engagement with the head of the tripod irrespective of changes in the positions of the leg relative to the head, with locking means which is manually actuatable to lock the stop member against adjustment when the tripod leg has been moved to a selected position, so as to enable the stop member to co-act with the tripod head and leg in preventing opening movement of the latter beyond the selected position.

With these and other objects in view, my invention resides in the combinations, arrangements and functional relationships of elements as set forth in the following specification and particularly pointed out in the appended claims.

In the accompanying drawings,

Figure 1 is a fragmentary view showing a portion of the tripod head and the upper portion of a leg, with one form of automatically adjustable stop device embodying my invention applied thereto;

Figure 2 is a vertical sectional view taken on the line 2—2 of Figure 1;

Figure 3 is a detail sectional view taken on the line 3—3 of Figure 2;

Figure 4 is a view similar to Figure 2 and illustrating a second form of stop device embodying my invention; and Figure 5 is a detail sectional view taken on the line 5—5 of Figure 4.

Referring specifically to the drawings, and particularly to Figures 1, 2 and 3, this form of my invention comprises an elongated support or body B having a flat pad or attaching portion 10 on which is a tubular portion or barrel 11 in whose bore 12 is slidably mounted a stop or abutment member 13 in the form of a pin reduced in diameter at one end to provide a guide shank 14 slidably fitting into the reduced portion 15 of the bore 12. A coil spring 17 surrounds the shank 14, with one end of the spring abutting the annular shoulder 18 on the pin 13 at the junction of the shank with the body diameter of the pin, and the other end of the spring abutting the annular shoulder 19 in the bore 12, all to the end of urging the pin 13 axially and outwardly of the bore.

The outer end portion 20 of the barrel 11 projects beyond the end of the pad 10 and is provided with longitudinal and transverses slots 21 and 22, respectively, which are joined together for co-action in rendering the barrel portion 20 sufficiently constrictable to rigidly clamp the pin 13 in any selected position of adjustment. A locking member 23 in the form of a screw is provided at its outer end with a knob 24, and extends freely through a longitudinal slot 25 in the pin 13. The inner end of the locking member 23 is screw threaded at 26 into an internally threaded collar 27 projecting from the side of the barrel portion 20 for co-action of the threads in constricting the barrel portion 20 upon turning the locking member in a direction for an annular shoulder 28 on the screw at the knob 24 thereof to abut the side of the barrel portion 20 opposite the collar 27.

One of the stop devices as above described is applied to each tripod leg L of a tripod adjacent to the upper end of the leg which is pivotally mounted at 30 on lugs 31 depending from the under side of the head H of the tripod as shown in Figures 1 and 2. A suitable recess is bored in the leg L to receive the collar 27, and holes are bored through the leg to receive round head machine screws 32 which are screwed into threaded lugs 33 on the pad 10 to rigidly secure the body B to the leg with the longitudinal axis of the stop member 13 in parallel relation to the length of the leg.

In operation, and assuming that the locking member 23 is loose so as to permit the constrictable portion 20 of the barrel 11 to expand slightly and thus free the stop member 13, the spring 17 urges the stop member axially until its outer end strikes the underside of the tripod head H. Irrespective of the amount or direction of movement of the tripod leg L about the pivot 30 on the head H, the spring 17 will maintain the stop member in engagement with the head. Thus the pin is automatically adjusted as the leg is moved, and it is only necessary to tighten the locking screw 23 to lock the stop member 13 in any position in which it is desired that the member co-act with the head in positively preventing any further opening movement of the leg. When the position of the leg is changed, the locking screw 23 is loosened to again render the stop member automatically adjustable by the functioning of the spring 17.

Reference will now be had to Figures 4 and 5 which illustrate a second form of stop device embodying my invention and which is identical in construction to the form previously described with the exception that locking of the stop member 13a is accomplished by a locking member 23a in the form of a screw having a knob 24a at its outer end, and a reduced threaded inner end portion 35 providing an annular shoulder 36.

The longitudinal slot 21a which co-acts with the transverse slot 22a to render the portion 20a of the barrel 11a constrictable, extends through two ears 37 on the portion 20a. The shank 38 of the locking member 23a fits freely into a hole 39 in the leg L' meeting a second hole 40 which receives the ears 37. The reduced portion 35 of the locking member passes freely through a smooth hole 41 in one of the ears 37, and is threaded into a registering hole 42 in the other one of the ears. Thus, upon tightening the locking member, it will co-act with the ears 37 in constricting the barrel portion 20a about the locking member 23a to rigidly secure same against its automatic adjustment by the functioning of the spring 17a as above described.

I claim:

1. An automatically adjustable stop device for the legs of tripods which comprises: a stop member; means adapted to mount said member on a tripod leg for movement towards and away from the head of the tripod; spring means operatively associated with the stop member to yieldingly urge same into engagement with the tripod head irrespective of opening and closing movements of the leg; and means co-actable with the stop member to lock same against movement, for co-action of the stop member with the tripod head in limiting opening movement of the leg.

2. An automatically adjustable stop device for the legs of tripods which comprises: a stop member; means adapted to mount said member on a tripod leg for movement to engage and disengage the head of the tripod at the outer side of the leg; spring means co-acting with said member to maintain same in engagement with the tripod head irrespective of opening and closing movements of the leg; and a locking member manually operable to co-act with said mounting means in locking the stop member against said movements thereof, for co-action of the stop member with the tripod head in definitely limiting opening movement of the leg.

3. An automatically adjustable stop device for the legs of tripods which comprises: a stop pin; means adapted to mount said pin on the outer side of a tripod leg for axial movement longitudinally of the leg; a spring urging said stop pin axially in a direction for the pin to engage the tripod head irrespective of opening and closing movements of the leg, so as to automatically adjust the pin accordingly; and means by which said pin can be locked against movement, in any selected position of adjustment of the leg, for co-action of said pin with the tripod head in preventing opening movement of the leg beyond said selected position.

4. An automatically adjustable stop device for the legs of tripods which comprises: a barrel adapted to be secured to a tripod leg to extend longitudinally thereof; a stop pin slidably mounted in the bore of the barrel; a spring in the barrel bore co-acting with the stop pin to urge same into engagement with the tripod head; and a locking member co-acting with said barrel to secure the leg against movement relative to the barrel in any selected position of adjustment of the tripod leg.

5. An automatically adjustable stop device for the legs of tripods which comprises: a barrel adapted to be secured to a tripod leg to extend longitudinally thereof; a stop pin slidably mounted in the bore of the barrel; a spring in the barrel bore co-acting with the stop pin to urge same into engagement with the tripod head; said barrel having a constrictable portion; and a locking screw co-actable with said portion of the barrel to constrict same and secure said pin against movement relative to the barrel.

6. An automatically adjustable stop device for the legs of tripods which comprises: a barrel adapted to be secured to a tripod leg to extend longitudinally thereof; a stop pin having a longitudinal slot and being slidably mounted in the bore of the barrel; a coil spring in the barrel engaging the pin to urge same axially in a direction for the pin to engage the tripod head; a portion of said barrel being split to render it constrictable; and a locking screw extending through said slot and co-actable with said split portion of the barrel to constrict same about said pin, so as to lock the latter in any selected position of adjustment.

7. An automatically adjustable stop device for the legs of tripods which comprises: a barrel adapted to be secured to a tripod leg to extend longitudinally thereof; a stop pin slidably mounted in the bore of the barrel; a spring in the barrel bore co-acting with the stop pin to urge same into engagement with the tripod head; a portion of said barrel being slotted longitudinally and having ears through which said slot extends; and a locking screw co-actable with said ears to constrict said portion of the barrel and lock said pin against movement relative to the barrel.

PARK J. RIES.

REFERENCES CITED

The following references are of record in the file of this patent:

UNITED STATES PATENTS

| Number | Name | Date |
|---|---|---|
| 2,234,357 | Ries et al. | Mar. 11, 1941 |